Inventor:
Jean Fallou,
by Charles N Tullar
His Attorney.

Inventor:
Jean Fallou,
by Charles V. Tullar
His Attorney.

Patented Nov. 14, 1933

1,935,438

UNITED STATES PATENT OFFICE 1,935,438

PROTECTING DEVICE FOR ELECTRIC LINES

Jean Fallou, Paris, France, assignor to General Electric Company, a corporation of New York Application May 14, 1931, Serial No. 537,401, and in France May 16, 1930. Renewed August 18, 1933

5 Claims. (Cl. 175—294)

The object of my invention is to provide improved protective devices for main lines of electric power systems wherein the lines comprise a plurality of parts or sections at the ends of each of which circuit breakers are disposed for isolating a part within which there occurs a fault such as a contact between wires or earth connection.

The invention, in its essentials, consists in superposing on or transmitting over the wires of the part of the line to be protected auxiliary polyphase currents, whose frequency is higher than the frequency of the power current of the system, the superposed auxiliary currents being balanced when the line is in good condition and the unbalancing effect produced by a fault in the line causing a special relay to be energized, so as to actuate the corresponding circuit breaker.

The forms of protective devices embodying the invention will now be described, by way of example, with reference to the annexed drawings, in which:—

Figure 1:
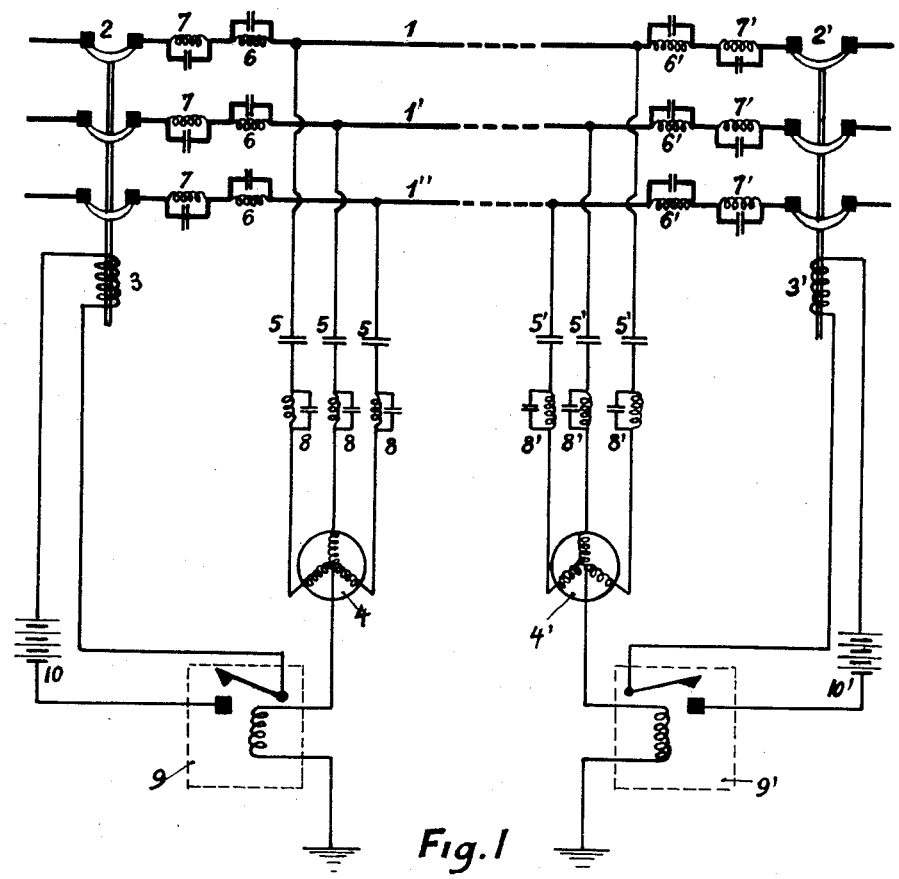
Figure 1 is a diagram of one of the protective devices, in which a generator of polyphase high frequency currents is disposed at each end of the section.

In Figure 1, the line is assumed to be a three-phase line having phase wires or conductors 1, 1', 1''. The section of line to be protected is provided at the input and output ends with circuit breakers 2, 2' capable of being opened automatically when their releasing or trip coils 3, 3' are energized by a current. At each end of the section, there are provided auxiliary polyphase generators 4 and 4' which superpose on the line through suitable coupling devices, such as condensers 5 and 5', currents whose frequencies are different from each other and are higher than the frequency of the power current normally flowing in the line. The auxiliary generators 4 and 4' are so disposed that they send on the lines polyphase currents which are balanced as long as the line has no insulation fault either between the wires or between the wires and the earth, and as long as no wire is broken. At each end of the section plug or trap circuits 6 and 6', 7 and 7', of the well known type, are provided, the plug circuits 6 and 6' preventing the currents of the generator 4 being propagated further than the section to be protected, and the plug circuits 7 and 7' fulfilling the same function in respect of the current produced by the generator 4'. Moreover, in series with the coupling devices 5, plug or trap circuits 8 are provided for the purpose of preventing the currents produced by the generator 4' from reaching the generator 4. In the same manner, plug circuits 8' are provided in circuit with the coupling devices 5' in order to prevent the currents produced by the generator 4 from reaching the generator 4'.

The protective device also comprises, at each end of the line, relays 9 and 9', connected in such a way that they are energized respectively by the currents of generators 4 and 4', but only when these currents are unbalanced. In the form of device shown by way of example in Fig. 1, the relays 9 and 9' are connected between the neutral point of each generator 4 or 4' and the earth. Thus, they are energized only when the sum of the currents supplied by the different phases of each of said generators ceases to be zero. It will be understood that any other mode of connecting the said relays can be employed in order that they will be energized when the currents supplied by the generators 4 and 4' are unbalanced whether or not the sum of said currents is normally zero.

When the relays 9 and 9' are energized, they close their circuits and the releasing coils 3 and 3' are respectively fed by the electric batteries or supply sources 10 and 10'.

The auxiliary generators 4 and 4' may be of any known type and may comprise either rotating apparatus or vacuum-tube devices. In the latter case, the generating devices 4 and 4' are preferably started only when the line is short-circuited or earthed by means of a relay fed by the working currents or voltages of the line. This relay may be of the type actuated by an excess current or by the currents or the voltages becoming unbalanced.

The working of the device above described is as follows:

So long as the polyphase line 1 is in good condition, the currents superposed on the said line, either by the generator 4, or by the generator 4', are balanced, and thus unable to energize the relays 9 and 9'. On the other hand, if a fault occurs on line 1, as a consequence either of a short-circuit or of an earthing of one or two phases, or by breaking of one phase, the currents supplied by generators 4 and 4' become unbalanced and energizes the relays 9 and 9', which therefore actuate the circuit breakers 2 and 2'. The relays 9 and 9' may also actuate signalling devices.

The device possesses the following advantages:
1. It practically works instantaneously;
2. It does not necessitate any accurate adjustment of the relays;
3. The unbalancing effect of the currents superposed on the line, which causes the relays to be energized, depends only on the insulation of the phases of the line, and the operation can be made independent of the losses by leakage in the normal state;
4. The high frequency generators may be used at the same time for communication between the ends of the line.

Figure 4:
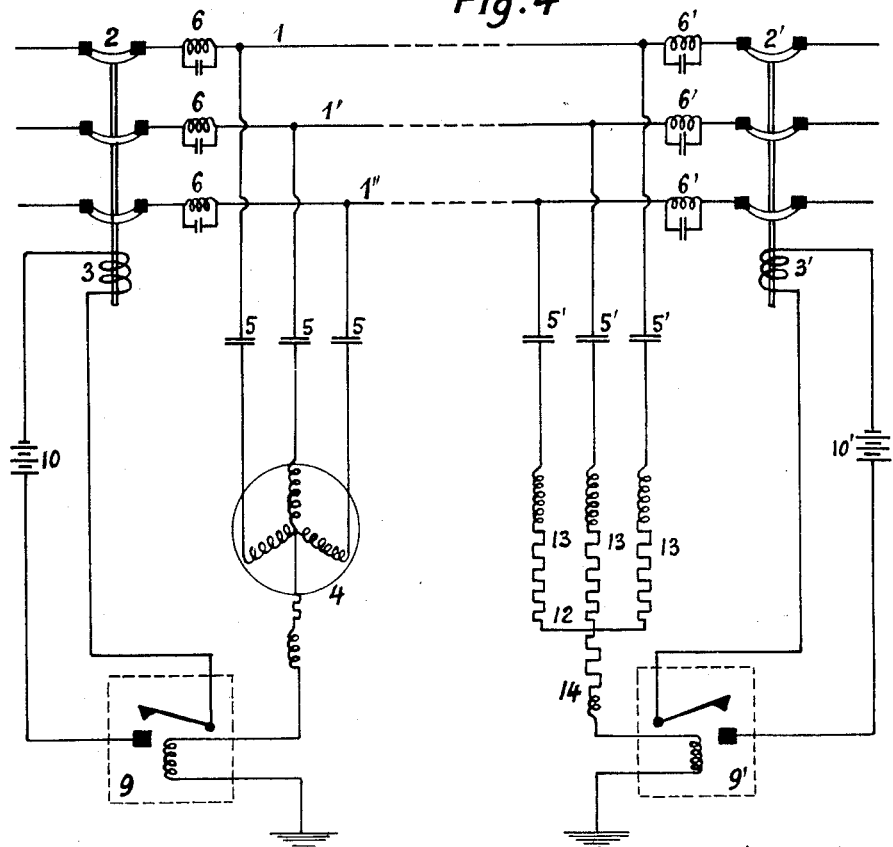
Figure 4 is a diagram of a modified protective device, in which only one generator is provided in each section.

The device represented in Figure 4 comprises a single generator for each line section. The underlying feature of this device is that the line, at the end opposite to the generator, terminates in a high frequency receiver constituted by balanced impedances equal to the initial sending-end impedance of the line, that is the impedance of the line as viewed from the transmitting point and assumed to be of infinite length, thus avoiding the standing wave phenomenon due to reflection and smoothing the distribution of potential along the line.

The high frequency currents flowing in the receiver control a relay which is energized when the currents become unbalanced, and thereupon effects the operation of the circuit breaker of the corresponding station.

Figure 2:
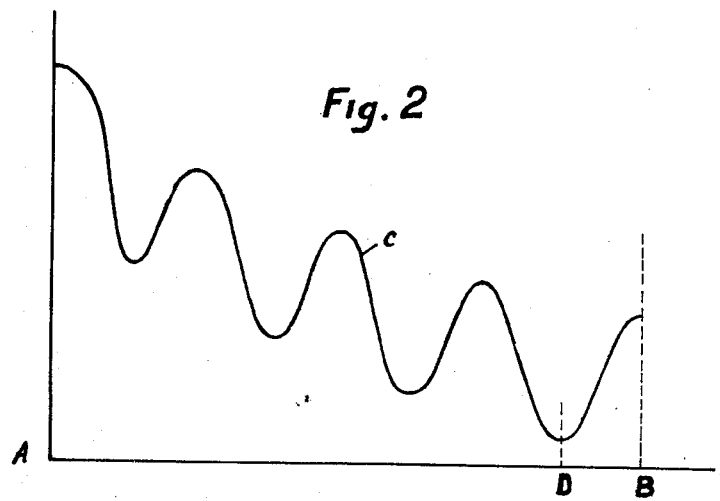
Figure 2 is a diagram showing the variation of potential along a line fed at high frequency and insulated at its end.

For the curve shown on Figure 2, the abscissæ represent distances along the line, and the ordinates the potential amplitudes. The point A corresponds to the end of the line where the high frequency generator is assumed to be connected, and B is the other end of the line which is assumed to be insulated, or, which is exactly the same, closed by a plug circuit. The potential amplitude, with respect to the distance, is then represented by a curve C, which is the sum of a sinusoidal function and of a hyperbolic function. The consequence is that, at certain points of the curve, such as D, the line potential may be very low, and, if a short-circuit is produced at this point, the currents supplied at the other end by the generator remain almost unaltered, or at least are not sufficiently altered to energize a relay.

Figure 3:
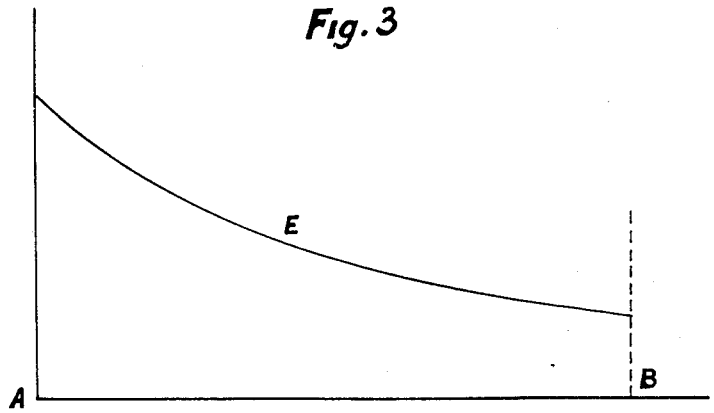
Figure 3 is a diagram showing the variation of the line potential when the line is closed upon an impedance equal to its own initial sending-end impedance.

On the curve E of Figure 3, the abscissæ represent the distances along the line and the ordinates the potential amplitudes. But, in this case, the line is assumed to be closed at its end B by an impedance equal in magnitude and phase to the initial sending-end impedance of the line. The potential amplitude in relation to the distance is then represented by an exponential curve, which increases continually from the end B to the end A without having any minimum between its ends. In this latter case, a short-circuit occuring at any point of the line will always alter the currents supplied by the generator connected at A. In such conditions, if the line is a polyphase one, and if a polyphase high frequency supply feeds the line with currents which are balanced as long as the line is in good condition, then, a symmetrical short-circuit occurring at any point of the line destroys the symmetry of the currents flowing either in the generator or in the receiving impedance. It is then sufficient to dispose, at the sending and receiving ends, relays sensitive to the dissymmetry of currents.

In Figure 4, the same reference numerals as in Figure 1 are used to indicate the same parts. Thus, in this second embodiment of the invention, 1, 1', 1'' are the wires of the section to be protected, the line being assumed to be three-phase. The line section as shown is provided, at the input and output ends, with circuit breakers 2 and 2' capable of breaking the circuit automatically when their releasing coils 3 and 3' are energized. At the end of the line where the circuit breaker 2 is disposed, an auxiliary polyphase generator 4 is located so that it superimposes on the line through suitable coupling devices, such as condensers 5, currents whose frequency is higher than the frequency of the power current flowing normally through the line. The generator is disposed in such a manner that these superposed currents are balanced as long as there is no insulation fault in the line either between wires, or between wires and earth, or as long as no wire is broken.

Preferably, each phase of the generator has an impedance equal to the initial sending-end impedance of the line working with three phase balanced currents; and its neutral point is earthed by means of an impedance such that the resulting impedance of the generator, for three currents equal in amplitude and phase flowing respectively by the three branches towards the earth, is exactly equal to the initial sending-end impedance of the line when three currents equal in amplitude and phase flow respectively across the three wires towards the earth.

At the other end of the line, i. e. where the circuit breaker 2' is placed, a high frequency receiving device 12 is coupled with the line 1, 1', 1'' by condensers 5'. This receiver may comprise three impedances 13, star connected, the neutral point being earthed by a fourth impedance 14. The impedances 13 are equal to the initial sending-end impedances of the line when working as a balanced three-phase line, and the impedance 14 is so chosen that the resulting impedance of the receiver for three currents, equal in amplitude and phase, flowing respectively in its three branches towards the earth, is equal to the initial sending-end impedance of the line when three currents, equal in amplitude and phase, flow respectively in its three wires towards the earth.

At each end of the section, plug circuits 6 and 6', of well known type are inserted so as to prevent the currents supplied by the generator 4 from flowing beyond the section to be protected.

The device comprises also, at each end of the lines, relays 9 and 9', connected in such a way that they are energized by the currents of the generator 4 or of the receiver 12, but only when these currents are no longer balanced. In the embodiment shown in Figure 4, the relays 9 and 9' are connected between the neutral point and the earth, but it will be understood that, for these relays, any connection can be used whereby they are energized when the currents, fed by the generator 4 and received by the receiver 12, become unbalanced.

The device shown in Figure 4 has been given only as an example, and any equivalent device can be used without changing the scope of the invention.

In particular, in the example in Figure 4, it is assumed that the high frequency supply feeds the line with currents which are polyphase and balanced as long as the line is in good condition;

and the generator allows for the protection of the line, when two phases are short-circuited without any wire being earthed or broken. Nevertheless, if the line must be protected only against the short-circuits by earthing, it is possible, say, to dispose, at one of the ends, a supply of high frequency monophase current sending, in the three wires, currents equal in amplitude and phase. But, according to the invention, a receiving device as disclosed hereinabove will be disposed at the other end, this receiver having impedance equal to the initial sending-end impedance of the line, and serving to lessen and even to suppress the potential undulations along the line. By then placing near the generators and near the receivers, relays adapted to be energized as soon as the currents, or the potentials, or the ratio between the currents and the potentials become or becomes disturbed, a device is obtained which is sensitive to the faults in the line, whatever be the place of the fault, and without the necessity of using two or more different waves, as has been proposed.

What I claim is:—

1. A protective device for electric main lines, comprising circuit breakers at each end of a line section to be protected, a coil for each circuit breaker adapted to release the circuit breaker when energized, a generator of polyphase high frequency currents at one end of the line section, plug circuits at each end of said section for preventing the polyphase currents from flowing beyond said section, an impedance arranged at the end of the section opposite from the generator and substantially equal to the initial sending-end impedance of the line, a relay connected between the earth and the neutral point of the generator, a relay connected between the earth and the neutral point of said first-mentioned impedance, and means for energizing, by each of said relays, the coil of the corresponding circuit breaker when the high frequency currents become unbalanced.

2. In combination, a polyphase alternating current electric circuit, means for controlling said circuit including generating means at one point of the circuit connected to superpose on the conductors thereof polyphase currents of a frequency differing from the frequency of the circuit current, impedance means connected to said circuit at another point substantially equal to the impedance of the circuit to said superposed currents as viewed from the transmitting point of the circuit and means in the circuit of said impedance means operative on the occurrence of a fault on the circuit causing an unbalance in the superposed polyphase currents.

3. In combination, an electric circuit, means for controlling said circuit including means at one point of the circuit connected to superpose on the conductors of the circuit currents of a relatively high frequency, impedance means connected to said circuit at another point substantially equal to the impedance of the circuit to said superposed currents as viewed from the transmitting point of the circuit, and means in circuit with said impedance means operative on the occurrence of a fault on the circuit causing an unbalance of the superposed currents.

4. In combination, a polyphase alternating current electric circuit, circuit interrupting means at each of two points of the circuit, generating means at one of said points connected to superpose on the conductors of the circuit polyphase currents of a frequency different from the frequency of the circuit current, means for preventing said superposed polyphase currents from flowing in said circuit outside of the section between said points, impedance means connected to said circuit at another of said points substantially equal to the impedance of the circuit to said superposed currents as viewed from the transmitting point of the circuit and means in circuit with said generating means and said impedance means operative to effect the opening of said circuit interrupting means on the occurrence of a fault on the circuit causing an unbalance in the superposed polyphase currents.

5. In combination, an electric circuit, means for controlling said circuit including generating means at one point of the circuit connected to superpose on the conductors of the circuit currents of a relatively high frequency, impedance means connected to said circuit at another point substantially equal to the impedance of the circuit to said superposed currents as viewed from the transmitting point of the circuit both of said generating and impedance means having grounded neutral points, and means in circuit with said generating means and said impedance means operative on the occurrence of a fault on the circuit causing an unbalance of the superposed currents.

JEAN FALLOU.